J. BRANNING.
Horse-Power Sweep.
No. 228,307.                    Patented June 1, 1880.
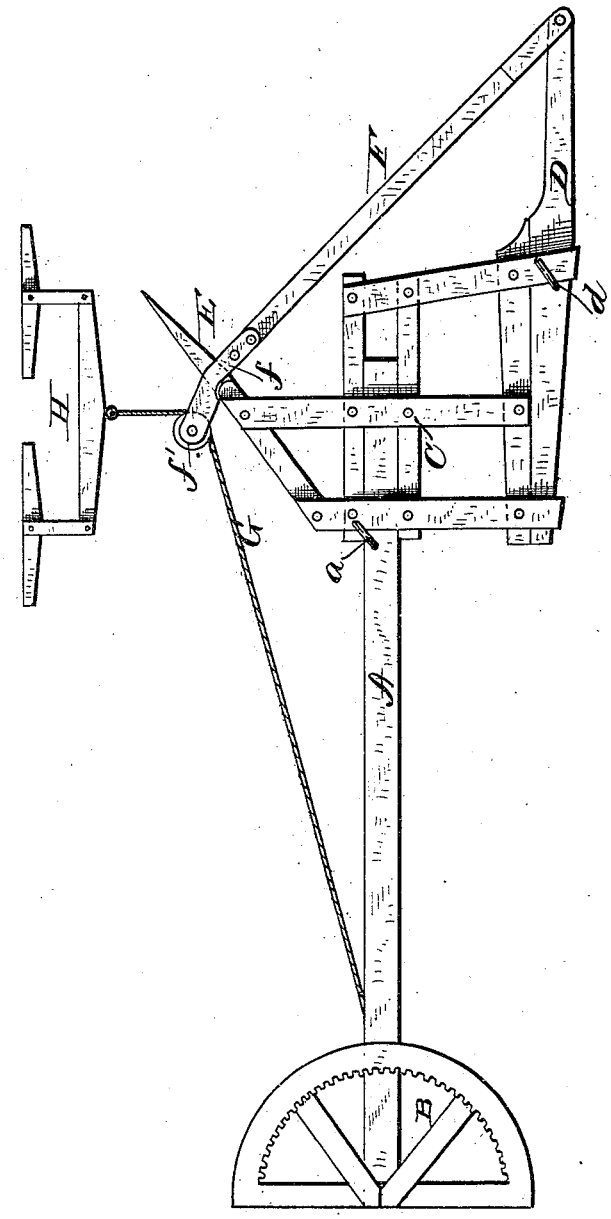

UNITED STATES PATENT OFFICE.

JOSEPH BRANNING, OF BLOOMING PRAIRIE, MINNESOTA.

HORSE-POWER SWEEP.

SPECIFICATION forming part of Letters Patent No. 228,307, dated June 1, 1880.

Application filed February 28, 1880.

*To all whom it may concern:*

Be it known that I, JOSEPH BRANNING, a citizen of the United States, residing at Blooming Prairie, in the county of Steele and State of Minnesota, have invented certain new and useful Improvements in Horse-Power Sweeps; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

The drawing represents, in a top-plan view, the present invention, which relates to that class of devices known as "horse-power sweeps;" and the novelty consists more particularly in the arrangement and combination of the parts comprising the same, whereby a cheap, strong, and very efficient article is produced, as well as one that will enable a given number of horses to do a greater amount of work, and to do it easier than can be done in any of the present ways known to me, as will now be more in detail set forth and explained.

In the accompanying drawing, A denotes a sweep attached to or on the wheel of the horse-power in any usual or ordinary way, and at the other end secured to the frame C. To and upon said frame is fastened, in a handy and secure way, the inner end of the forwardly-projecting arm D. On the opposite side of said frame A the outwardly-projecting short arm E is secured, and in this way the sweep is placed between the two arms D and E.

To the outer end of arm D is jointed draft-rod F, which extends past the outer end of the sweep. The short arm E, passing through rod F or a link, $f$, on said rod, holds the same in its position or place. In the end of draft-rod E, or in link $f$, fixed on the end of F, is placed the equalizer-pulley $f'$, around which passes the equalizer-chain G, the outer end of which is fastened to the double-tree H and the inner end to the equalizer-sweep A.

The arm D is attached to the frame C in such a manner that it can be readily removed or detached by withdrawing a pin, $d$, and thus making it more convenient to carry. Frame C can be removed from sweep A in a like manner by withdrawing a loose pin, $a$. By thus attaching the arm D on the end of the sweep so that it is set off from it by the frame C, and also extending the arm E at an angle from the sweep A, the line of draft is thrown in by the use of draft-rod F, thereby adding about one-fifth more power to sweep A without placing the horses at a greater distance from wheel B than would be necessary with a common length sweep.

Having thus described my invention, what I consider new, and desire to secure by Letters Patent, is—

1. The combination of frame C, having long arm D on one side and short angularly-projecting arm E on the other, with jointed rod F, pulley $f$, chain $g$, and sweep A, substantially as and for the purposes set forth.

2. The combination of a sweep and rigid attachments with a hinged rod, pulley, and chain or rope, to afford a variable line of draft, substantially as described.

3. The frame C, having the sweep A and draft attachment detachable, substantially as described.

4. The rod F, hinged to arm D, and combined with frame C, and having link $f$ and pulley $f'$, substantially as and for the purposes set forth.

JOSEPH BRANNING.

Witnesses:
C. H. SCOTT,
L. ELLINGTON.